United States Patent
Wulf

(10) Patent No.: US 8,914,975 B2
(45) Date of Patent: Dec. 23, 2014

(54) METHOD FOR REPAIRING A GUIDE BLADE SEGMENT FOR A JET ENGINE

(75) Inventor: Joachim Wulf, Jasionka (PL)

(73) Assignee: MTU Aero Engines GmbH, Munich (DE)

( * ) Notice: Subject to any disclaimer, the term of this patent is extended or adjusted under 35 U.S.C. 154(b) by 1739 days.

(21) Appl. No.: 12/374,519

(22) PCT Filed: Jul. 13, 2007

(86) PCT No.: PCT/DE2007/001254
§ 371 (c)(1),
(2), (4) Date: Oct. 26, 2010

(87) PCT Pub. No.: WO2008/009270
PCT Pub. Date: Jan. 24, 2008

(65) Prior Publication Data
US 2011/0299982 A1 Dec. 8, 2011

(30) Foreign Application Priority Data

Jul. 20, 2006 (DE) .......................... 10 2006 034 055

(51) Int. Cl.
*B23P 6/00* (2006.01)
*F01D 5/00* (2006.01)
*F01D 9/04* (2006.01)

(52) U.S. Cl.
CPC ............... *F01D 5/005* (2013.01); *F01D 9/041* (2013.01); *Y02T 50/672* (2013.01); *B23P 6/002* (2013.01)
USPC .................. 29/889.1; 29/889.721; 29/402.03; 29/402.08

(58) Field of Classification Search
USPC ........... 29/889, 889.1, 889.2, 889.21, 889.22, 29/889.23, 889.7–889.722, 402.03, 29/402.04, 402.08; 415/139, 191
See application file for complete search history.

(56) References Cited

U.S. PATENT DOCUMENTS

| | | | |
|---|---|---|---|
| 3,275,295 A | | 9/1966 | Caldwell et al. |
| 3,650,635 A | | 3/1972 | Wachtell et al. |
| 4,305,697 A | | 12/1981 | Cohen et al. |
| 4,822,249 A | * | 4/1989 | Eckardt et al. ................ 416/235 |
| 5,060,842 A | | 10/1991 | Qureshi et al. |

(Continued)

FOREIGN PATENT DOCUMENTS

| EP | 1 099 508 A2 | 5/2001 |
|---|---|---|
| EP | 1 422 381 A2 | 5/2004 |

(Continued)

*Primary Examiner* — Sarang Afzali
(74) *Attorney, Agent, or Firm* — Greer, Burns & Crain, Ltd.

(57) ABSTRACT

A method for repairing a guide blade segment fashioned as a twin guide blade segment within a guide blade composite element, the guide blades being formed from a nose segment and a rear edge segment, the method having identification, within a guide blade segment, of a non-repairable guide blade to be separated from the guide blade composite structure; separation of a non-repairable guide blade from a one repairable guide blade in a first plane of division; division of at least one separated guide blade in a second plane of division between the nose segment and the rear edge segment; reconditioning of the at least one repairable nose segment and/or rear edge segment; joining of a reconditioned and/or new nose segment to a reconditioned and/or new rear edge segment to form at least one guide blade; and joining of at least two guide blades to form a guide blade segment.

8 Claims, 2 Drawing Sheets

(56) References Cited

U.S. PATENT DOCUMENTS

| | | |
|---|---|---|
| 5,269,057 A | 12/1993 | Mendham |
| 5,358,379 A | 10/1994 | Pepperman et al. |
| 5,895,205 A | 4/1999 | Werner et al. |
| 6,785,961 B1 | 9/2004 | Caddell, Jr. et al. |
| 6,785,971 B2 | 9/2004 | McDonnell |
| 7,632,363 B2 | 12/2009 | Yoshioka et al. |
| 2005/0091848 A1* | 5/2005 | Nenov et al. ............ 29/889.1 |
| 2005/0254944 A1 | 11/2005 | Bash et al. |

FOREIGN PATENT DOCUMENTS

| | | |
|---|---|---|
| EP | 1 658 923 A2 | 5/2006 |
| JP | 03-249302 | 11/1991 |
| JP | 2001-152873 | 6/2001 |
| WO | WO 03/048528 A1 | 6/2003 |
| WO | WO2004/111392 | 12/2004 |

* cited by examiner

METHOD FOR REPAIRING A GUIDE BLADE SEGMENT FOR A JET ENGINE

BACKGROUND

The present invention relates to a method and to a device for repairing a guide blade segment, the guide blade segment preferably being fashioned as a twin guide blade segment in a guide blade composite element that has at least two guide blades that are situated between an inner covering strip and/or an outer covering strip and are connected to one another by these, the guide blades also having a nose segment and a rear edge segment.

The technical area of the present invention relates to the repair of guide blade segments that are used in aircraft jet engines. Here, a turbine is constructed from turbine stages that are situated one after the other in the direction of flow. Each turbine stage is provided with stationary guide blades that can be accommodated between an inner cover strip and an outer cover strip, or at least on one of the cover strips. Depending on the specific embodiment of the turbine, what are known as twin guide blade segments may be used, each having two guide blades situated between a corresponding radial segment of the inner cover strip and/or of the outer cover strip, resulting in a component that can be handled individually. The flow channel is defined by the radial intermediate space between the inner cover strip and the outer cover strip through which the hot exhaust gases from the combustion chamber are conducted.

Due to the high temperatures of the gases that come into contact with the guide blades, the guide blade segments are subject to a high degree of material stress. Besides the thermal and chemical stresses, mechanical stresses may also occur as a result of the penetration of foreign bodies into the jet engine, because such bodies may collide with the guide blades, causing surface damage. In order to withstand the named stresses, the guide blade segments are made for example of highly temperature-resistant cobalt-nickel alloys, and are often provided with a surface coating in order to achieve protection against corrosion as well as mechanical protection. In addition, in order to reduce thermal stress cooling ducts are provided both in the nose segment and also in the rear edge segment of the guide blade, separated from one another by a web in the interior of the guide blade.

Despite these precautionary measures for prolonging the useful life of the guide blade segments, the significant stresses may still cause damage to the guide blades, with the result that, depending on the degree of damage, these blades must be exchanged for new blades or repaired blades. Due to the complex construction of the blades, as well as the very valuable and expensive materials used in their construction, it is often advantageous to replace defective guide blade segments that can no longer be used with repaired guide blade segments, with the aim of replacing the blades not only in the composite element as a twin guide blade segment, but of removing individual guide blades from the guide blade segment and replacing them with new or correspondingly repaired guide blades. In this context, the smallest separable unit is the guide blade as such.

A method for repairing guide blade segments is disclosed in patent specification U.S. Pat. No. 6,785,961 B1. This document discloses a method that is used principally for the repair of guide blade segments. Here, the guide blade segments comprise at least two guide blades situated between an inner cover strip and an outer cover strip, and the method comprises the step of separating the guide blades to obtain a first guide blade that can be repaired and a second guide blade that cannot be repaired, the first guide blade being connected to a newly manufactured guide blade and having the same construction as the second guide blade.

U.S. Pat. No. 3,650,635 discloses a method for repairing guide blades of a gas turbine in which a damaged nose segment is removed from the blade profile part and is replaced with a correspondingly formed replacement part. In this method, the removed segment contains only the nose profile and a part connected thereto of the blade profile main part wall, with the result that it is not ensured that the corresponding replacement part, connected to the fitting and connecting wall surfaces created in this way, will exhibit long-term resistance against all occurrent stresses. Damages in the other parts of the guide blade are thus not repairable, so that replacement of an entire guide blade would be required.

From U.S. Pat. No. 4,305,697, a method is known in which a front edge segment is removed from the blade along a cutting line, the cutting line being situated along a preselected path that undergoes relatively low mechanical stress during operation of the blade and that runs through at least one supporting platform, so that, in addition to the front edge area, a part of at least one supporting platform part is cut away that does not however extend up to the front edge of the platform part. This method also has the problem that only a limited partial area of the overall guide blade can be replaced, this partial area being limited to the front edge surface of the guide blade.

The object of the present invention is therefore to create an improved method and a device for the partial replacement of a plurality of partial areas of a guide blade.

SUMMARY

The method according to the present invention includes the steps of identification of a non-repairable guide blade within a guide blade segment that is to be removed from the guide blade composite element, separation of at least one non-repairable guide blade from at least one repairable guide blade, division of at least one separated guide blade in a second dividing plane between the nose segment and the rear edge segment, reconditioning of the at least one repairable nose and/or rear edge segment, joining of a reconditioned and/or new nose segment to a reconditioned and/or new rear edge segment to form at least one guide blade, and joining of at least two guide blades to form a guide blade segment.

This method creates the possibility of limiting the smallest exchangeable unit not only to the guide blade or to pre-manufactured partial areas thereof, but also to further divide the guide blade as such and to enable optional replacement of both of a nose segment and a rear edge segment. Here, at first a guide blade is identified that is in need of repair. The repair process can include the repair of breaks in the surface of the guide blade, and thus the rebuilding of the required profile surface. In addition, the repair may comprise build-up welding or a similar method in order to restore the required contour. In addition, a thermal method may be used by means of which the inherent tensions in the guide blade segments are relieved, the application of the thermal method advantageously taking place before the separation of the individual guide blade from the guide blade segment. The repeatability of the repairs is limited by occurrent local deformations of the guide blades, as well as by undershooting of a minimum wall thickness, reduced due to repeated chemical detachment processes for each repair operation. This means that the guide blades may reach a level of damage at which repeated repair is no longer permissible. In this case, the guide blade, or the nose segment or rear edge segment, is replaced by a new part.

Depending on the specific embodiment of the guide blade segment, there is the possibility for the guide blades to be connected in one piece, i.e. in materially integral form, to the outer covering strip and/or to the inner covering strip. However, according to other specific embodiments it is also possible for the guide blades to be connected between the inner cover strip and/or the outer cover strip by positive-fit connections that are detachable. Thus, in the first case the separation of the repairable guide blade from the non-repairable guide blade can take place in a first plane of division located in the inner cover strip or in the outer cover strip between the guide blades. If, however, the guide blades are situated on the cover strips by means of a detachable mechanical connection, it is possible to carry out the division or separation of the repairable guide blade from the non-repairable guide blade by detaching the detachable connection between the guide blades and the cover strips. According to another exemplary embodiment of the present invention, it is provided that the guide blades have at least one web between the nose segment and the rear edge segment, and the second plane of division is situated in the web. In this way, the division of the guide blade in the second plane of division can take place using a division method from the group of erosion methods, including a wire erosion method.

The web situated inside the guide blade separates a front cooling duct from a rear cooling duct. The separate area comprising the front cooling duct is defined as the nose segment, and the area of the rear cooling duct is defined as the rear edge segment. If the division method is carried out using a wire erosion method, a very high degree of precision can be achieved, and the thin web can also be divided, resulting in a homogenous division surface that is advantageous during the later joining or bringing together of the nose segment with the rear edge segment. In other specific embodiments of the cross-section of a guide blade, for example having a plurality of webs, a plurality of plane of divisions may also be provided, so that the guide blade can be separated into at least two parts.

According to another specific embodiment of the present invention, it is provided that in order to repair the guide blade between the nose segment and the rear edge segment after the rebuilding, a method is used from the group of joining methods including a welding method or a soldering method. The welding method may be realized as forge welding, gas welding, manual arc welding, gas-shielded welding, resistance welding, cold press welding, frictional welding, submerged arc welding, laser welding, electron beam welding, or any other possible welding method.

According to another exemplary embodiment of the present invention, it is provided that in order to repair the guide blade, after reconditioning both the nose segment and the rear edge segment are situated inside the inner cover strip and/or the outer cover strip with a positive fit and/or with a material bond, and are mounted therein. Here it is to be noted that there are various specific embodiments of guide blades that may be fastened to the cover strips in different ways. Specifically, embodiments are also known in which the guide blades are clamped or wedged inside the cover strips. Such bonding techniques make separation of the guide blades in a first plane of division within the cover strips superfluous, so that after reconditioning they can also be replaced between the cover strips in two-part form. If the guide blade has been divided in the second plane of division, and either the nose segment or the rear edge segment has been replaced, the guide blade can again be situated in two-part form between the cover strips, the clamping of the respective nose and rear edge segments between the cover strips taking place individually. A complete guide blade nonetheless results, in which a joining method for joining the nose and rear segments to each other is unnecessary.

The present invention also relates to a guide blade that is situated, as part of a guide blade segment, within a guide blade composite element in a jet engine, the guide blade being fashioned from an individual nose segment and an individual rear edge segment that are situated relative to one another in such a way that the guide blade can be formed. Here the guide blade has a second plane of division, and the nose segment and the rear edge segment are bonded to one another by a joining method in the second plane of division. In addition, the guide blade is situated between an inner cover strip and an outer cover strip, and the nose segment and the rear edge segment can be mounted with a positive fit and/or with a material bond inside the inner cover strip and the outer cover strip. In its interior, the guide blade can have a web such that the second plane of division runs through the web.

Additional measures that improve the present invention are indicated in the subclaims, or are presented in more detail in the following together with the description of a preferred exemplary embodiment of the present invention on the basis of the Figures.

DETAILED DESCRIPTION

Figure 1:
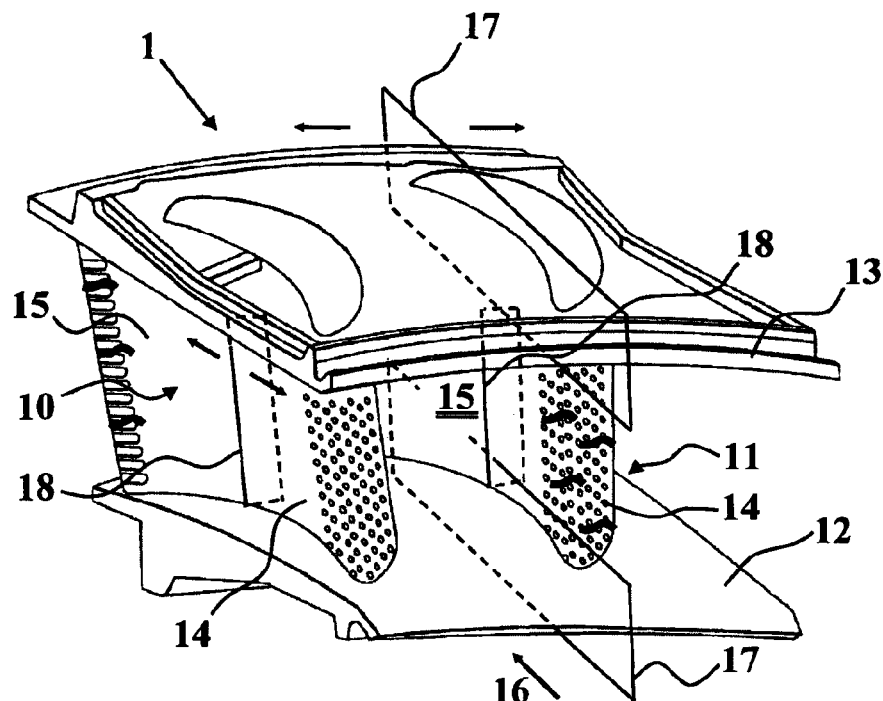
FIG. 1 shows a perspective view of a twin guide blade segment, the guide blade segments each having a repairable and a non-repairable nose segment, as well as a rear edge segment.

FIG. 1 shows a guide blade segment 1 that is fashioned as a twin guide blade segment. A twin guide blade segment comprises two guide blades 10 and 11 that are situated at a distance from one another such that a flow cross-section is formed between guide blades 10, 11. The corresponding working gas flows through the flow cross-section from a direction of flow 16, and the guide blade segment forms a stator that is installed in stationary, non-rotating fashion in the body of the jet engine. Guide blade 10 is designated as a repairable guide blade, having an undamaged nose segment 14 and a damaged rear edge segment 15; guide blade 11 is designated as a non-repairable guide blade, having a non-repairable nose segment. The representation of these non-repairable areas is to be understood only as an example. In addition, the designation of the repairable and non-repairable guide blades is intended only to establish a distinction. Guide blades 10, 11 are situated between an inner cover strip 12 and an outer cover strip 13, a turbine stage being constructed from a multiplicity of guide blade segments 1 situated on a circumference. The overall guide blade composite structure can be divided into a plurality of twin guide blades 1 according to the present exemplary embodiment, so that repair of guide blade segments 1 can take place individually.

In order to separate guide blade 10 from guide blade 11, according to the present method first a separation is carried out of inner cover strip 12 and outer cover strip 13 in a first plane of division 17. The separation of the guide blades in the area of the cover strips can be carried out using a wire erosion method, which, due to the materials used, is particularly advantageous; mechanical sawing methods may also be used.

When guide blades 10 and 11 have been separated from one another in plane of division 17, it can be identified which areas of guide blades 10, 11 must be replaced. Guide blades 10, 11 can each be divided into a nose segment 14 and a rear edge segment 15. The partial plane, or plane of division, within guide blades 10, 11 is indicated as second plane of division 18, shown here as a linear contour as an illustration. If guide blades 10, 11 are materially bonded, i.e. connected in one piece, to cover strips 12, 13, the contours of the indicated second plane of division 18 are to be understood as also extending through the cover strips. After the separation of guide blades 10, 11 in first plane of division 17, the separation of nose segment 14 from rear edge segment 15 takes place in second plane of division 18. After segments 14, 15 have been repaired, there takes place a joining of the repaired or new segments of the nose or rear edge, and a subsequent joining or corresponding situation of the respective segments 14, 15 between cover strips 12, 13 may be carried out.

Figure 2:
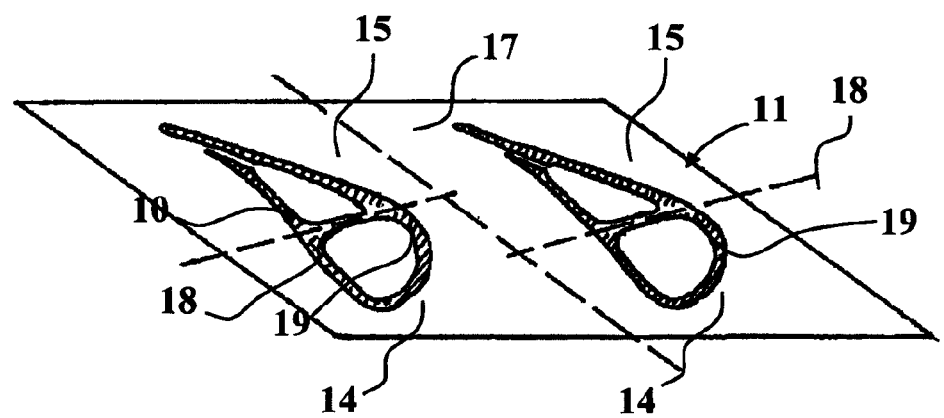
FIG. 2 shows a cross-sectional view of two guide blades, indicating the first and second plane of division.

FIG. 2 shows an example of a cross-section of a guide blade segment, both the first plane of division 17 and second plane of division 18 being indicated by broken lines in the cross-section. First plane of division 17 is situated between guide blades 10, 11, and second plane of division 18 divides a nose segment 14 from a rear edge segment 15 of guide blades 10 and 11. Second plane of division 18 is situated in a web 19 that extends essentially transverse to the direction of flow between the left lateral surface and the right lateral surface of guide blades 10, 11. If the separation now takes place in plane of division 18 using a separating method, a homogenous planar surface results as the dividing plane.

Figure 3:
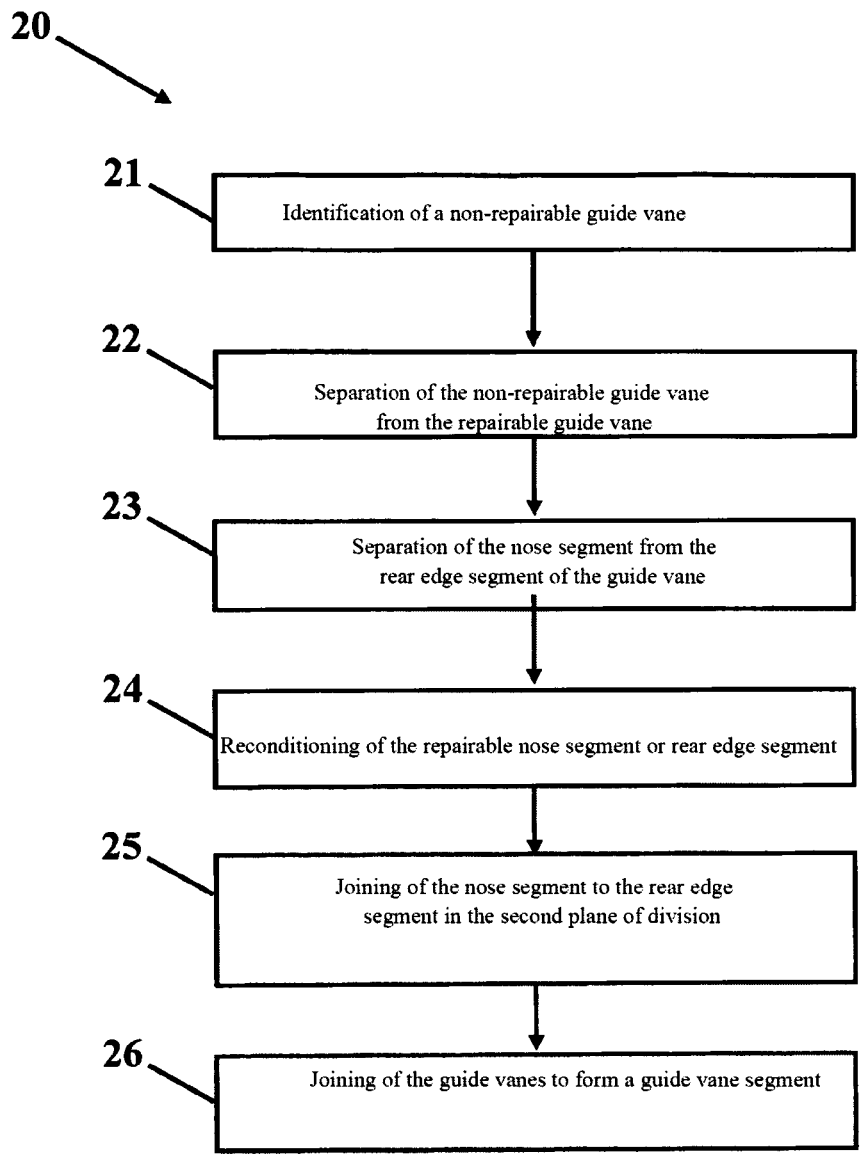
FIG. 3 shows a flow diagram indicating an exemplary sequence of the method according to the present invention.

FIG. 3 shows the method in a flow diagram 20, the representation being limited to six method steps; this is not to be regarded as a limitation of the protective scope of the present invention. Rather, additional method steps may be added, or named method steps may be omitted.

In first method step 21, first a non-repairable guide blade is identified, this identification being made mainly on the basis of the degree of damage of the guide blade. The identification also includes the localization of the damages in the area of the nose segment and of the rear edge segment. A second method step 22 follows that includes the separation of the non-repairable guide blade from the repairable guide blade. This separation can take place for example using a wire erosion method, but other separating methods are also possible, such as a mechanical separation using a saw cut. The same method for separating the nose segment from the rear edge segment of the guide blade is indicated in method step 23. Now the guide blades are separated from one another and the nose segment has also been separated from the rear edge segment. There follows in method step 24 a reconditioning of the repairable nose or rear edge segment. Non-repairable nose and rear edge segments may here also be replaced by new parts. The new parts here are either only the respective segments, in which case it must be taken into consideration if a new part is used the separation of a respective segment for a targeted use and for connection to a repaired segment is not conducive to achieving the desired end, because a new guide blade is better used as a whole. There follows in method step 25 the joining of the nose segment to the rear edge segment in the second plane of division, and finally, in method step 26, the guide blades are joined to form a guide blade segment.

The realization of the present invention is not limited to the preferred exemplary embodiment indicated above. Rather, a number of variations are conceivable that make use of the presented solution even in embodiments having a fundamentally different construction.

The invention claimed is:

1. A method for repairing a guide blade segment, the guide blade segment preferably being fashioned as a twin guide blade segment within a guide blade composite structure, having at least two guide blades that are situated between an inner cover strip and an outer cover strip and are connected to one another via said strips, the at least two guide blades each being formed from a nose segment and a rear edge segment, and the method comprising:
   identifying, within the twin guide blade segment, a non-repairable guide blade to be separated from the guide blade composite structure;
   separating at least one identified non-repairable guide blade from at least one identified repairable guide blade in a first plane of division;
   dividing said at least one separated repairable guide blade in a second plane of division between a nose segment and a rear edge segment, said second plane being transverse to said first plane;
   reconditioning of the at least one divided repairable nose segment and/or the divided rear edge segment and/or selecting a new nose segment and/or a new rear edge segment;
   joining of the reconditioned and/or the selected new nose segment to the reconditioned and/or the selected new rear edge segment to form at least one guide blade; and
   joining of two of the at least one formed guide blade formed by joining the reconditioned and/or joining the selected segments to form said twin guide blade segment.

2. The method as recited in claim 1, wherein each of the at least two guide blades having at least one web between the nose segment and the rear edge segment, and the second plane of division are situated in the web.

3. The method as recited in claim 1, wherein the division of the at least one separated repairable guide blade in the second plane of division is carried out using a separation method from the group of erosion methods, including a wire erosion method.

4. The method as recited in claim 1, wherein the separation of the repairable guide blade from the non-repairable guide blade takes place in a first plane of division that is situated in the inner cover strip and the outer cover strip between the at least two guide blades.

5. The method as recited in claim 1, wherein the guide blades are situated on the inner cover strip and on the outer cover strip by a detachable connection, and separation of the repairable guide blade from the non-repairable guide blade takes place by detachment of the detachable connection between the at least two guide blades and the cover strips.

6. The method as recited in claim 1, wherein the reconditioning of the at least one repairable nose segment and/or rear edge segment comprises a repair of profile surfaces by mending and heat treating surface flaws in the at least one repairable nose segment and/or rear edge segment.

7. The method as recited in claim 1, wherein a method from the group of the joining methods comprising a welding method or a soldering method is used for rebuilding the at least one repairable guide blade between the nose segment and the rear edge segment after reconditioning.

8. The method as recited in claim 1, wherein both the nose segment and the rear edge segment are situated within the inner cover strip and the outer cover strip with at least one of a positive fit and a material bond after reconditioning, and are mounted therein, in order to rebuild the at least one repairable guide blade.

* * * * *